United States Patent [19]

von der Crone

[11] 4,116,959

[45] Sep. 26, 1978

[54] ISOINDOLINE PIGMENTS

[75] Inventor: Jost von der Crone, Riehen, Switzerland

[73] Assignee: Ciba-Geigy Corporation, Ardsley, N.Y.

[21] Appl. No.: 724,828

[22] Filed: Sep. 20, 1976

[30] Foreign Application Priority Data

Sep. 26, 1975 [CH] Switzerland ............... 12567/75

[51] Int. Cl.² .............................................. C09B 57/00
[52] U.S. Cl. ............................... 544/284; 260/42.21;
544/285; 544/287; 260/287 K; 260/326.1;
544/105; 548/305; 544/289; 544/354
[58] Field of Search ............... 260/326.1, 256.4 Q, 260/309.2; 548/305

[56] References Cited

U.S. PATENT DOCUMENTS 3,923,806  12/1975  Bock et al. .................. 260/326.1
3,979,386   9/1976  Crone et al. ................. 260/309.2

Primary Examiner—Paul M. Coughlan, Jr.
Attorney, Agent, or Firm—Michael W. Glynn; Vincent J. Cavalieri

[57] ABSTRACT

Isoindoline pigment of the formula

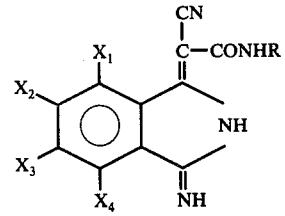

wherein R denotes a heterocyclic aromatic radical, $X_1$–$X_4$ denote hydrogen or halogen atoms or one or two of the radicals $X_1$–$X_4$ denote nitro, alkyl, alkoxy or phenoxy groups and the others denote hydrogen atoms which are useful for pigmenting high molecular organic material.

7 Claims, No Drawings

ISOINDOLINE PIGMENTS

The invention relates to valuable new isoindoline pigments of the formula

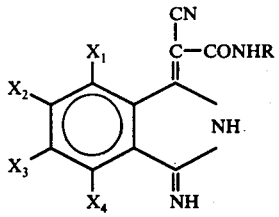

wherein R denotes a heterocyclic aromatic radical, $X_1$–$X_4$ denote hydrogen or halogen atoms or one or two of the radicals $X_1$–$X_4$ denote nitro, alkyl, alkoxy or phenoxy groups and the others denote hydrogen atoms.

R preferably represents an aromatic radical which contains a carboxylic acid amide group bonded in a ring.

Preferred pigments are those wherein R denotes a radical of the formula

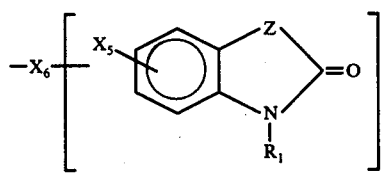

wherein $R_1$ denotes a hydrogen atom, an alkyl group containing 1–4 carbon atoms or a phenyl radical which is optionally substituted by halogen atoms or alkyl, alkoxy or alkanoylamino groups containing 1–4 carbon atoms, $X_5$ denotes a hydrogen or halogen atom, an alkyl or alkoxy group containing 1–4 carbon atoms or a phenoxy group, $X_6$ denotes a direct bond or a phenyl, phenylazo, phenylazophenylene or benzoylamino group which is optionally substituted, for example by halogen atoms or alkyl or alkoxy groups containing 1–4 carbon atoms, and Z denotes a single-membered or two-membered bridge, especially an O or S atom or a group of the formula

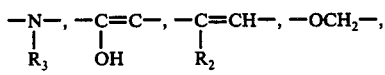

—NHCO— or —CONH, or —N=C—$R_3$, wherein $R_2$ and $R_3$ denote a hydrogen atom, an alkyl group containing 1–4 carbon atoms or a phenyl radical which is optionally substituted by halogen atoms or alkyl, alkoxy or alkanoylamino groups containing 1–4 carbon atoms and can be bonded by a direct bond to the imino group of the isoindoline radical, and Z must represent a NH group when $R_1$ does not denote a hydrogen atom.

Compounds wherein R denotes a radical of the formula

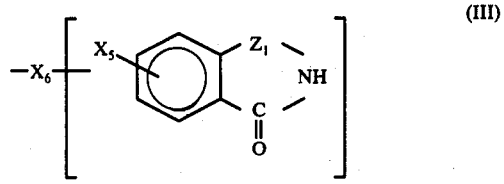

wherein $X_5$ and $X_6$ have the abovementioned meaning and $Z_1$ denotes a group of the formula

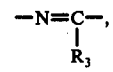

—CONH— or —NHCO—, wherein $R_3$ has the abovementioned meaning, are also preferred.

Pigments wherein R denotes a radical of the formula

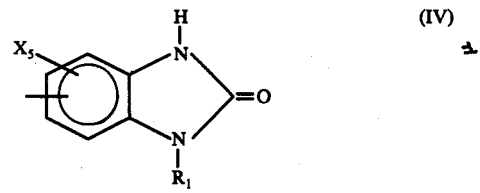

wherein $X_5$ and $R_1$ have the indicated meaning, are of particular interest.

Isoindolines of particular interest are those of the formula I wherein $X_1$–$X_4$ denote hydrogen atoms.

The new pigments are obtained when a 1,3-diiminoisoindoline of the formula

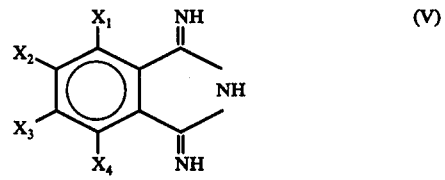

or an isoindoline derivative of the formula

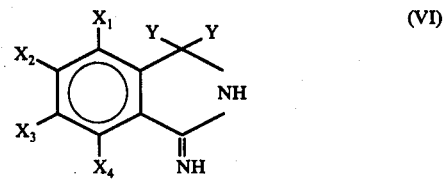

in which Y denotes an alkoxy or aryloxy radical, is subjected to a condensation reaction with a cyanacetamide of the formula

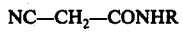

NC—CH$_2$—CONHR in a molar ratio of 1:1.

The starting material is preferably unsubstituted 1,3-diimino-isoindoline, which can also be present, or can react, in its tautomeric form as amino-imino-isoindolenine.

Further examples which may be mentioned are: 1,3-diimino-5-methyl-isoindoline, 1,3-diimino-5-methoxy-isoindoline, 1,3-diimino-6-methoxy-isoindoline, 1,3- diimino-5-phenoxy-isoindoline, 1,3-diimino-5-phenyl-isoindoline, 1,3-diimino-6-phenyl-isoindoline, 1,3-diimino-4-chloro-isoindoline, 1,3-diimino-5-chloro-isoindoline, 1,3-diimino-6-chloro-isoindoline, 1,3-diimino-7-chloro-isoindoline, 1,3-diimino-4,5-dichloro-isoindoline, 1,3-diimino-5,6-diphenyl-isoindoline, 1,3-diimino-5,6-dichloro-isoindoline, 1,3-diimino-4-nitro-isoindoline and 1,3-diimino-5-nitro-isoindoline.

The isoindolines mentioned are known compounds.

It is not necessary to isolate the isoindoline derivatives of the formula (VI). The corresponding phthalonitrile is used direct as the starting material and is reacted with an alcoholate or phenolate in a known manner and the dissolved compounds are used to carry out the condensation reaction with the cyanacetamides.

In the cyanacetamides, which are also to be used as starting materials, R preferably represents a radical of the formula (II), (III) or, in particular, (IV). The cyanacetamides are obtained by a condensation reaction of an alkyl or phenyl cyanacetate with an amine of the formula R-NH$_2$ wherein R has the indicated meaning. Examples of amines which may be mentioned are: 5-amino-benzimidazolone, 5-amino-1-methyl-benzimidazolone, 5-amino-1-n-butyl-benzimidazolone, 5-amino-1-phenyl-benzimidazolone, 5-amino-1-p-chlorophenyl-benzimidazolone, 5-amino-1-p-methylphenyl-benzimidazolone, 5-amino-1-p-methoxyphenyl-benzimidazolone, 5-amino-1-p-acetylaminophenyl-benzimidazolone, 5-amino-6-chloro-benzimidazolone, 5-amino-6-bromo-benzimidazolone, 5-amino-6-methyl-benzimidazolone, 5-amino-6-methoxy-benzimidazolone, 6-amino-benzoxazolone, 6-amino-5-chloro-benzoxazolone, 6-amino-5-methyl-benzoxazolone, 6-amino-5-chlorobenzthiazolone, 6-amino-5-methyl-benzthiazolone, 6-amino-quinazol-4-one, 6-amino-2-methyl-quinazol-4-one, 6-amino-2-methoxy-quinazol-4-one, 6-amino-7-chloro-2-methyl-quinazol-4-one, 6-amino-2-phenyl-quinazol-4-one, 6-amino-2(4'-methoxyphenyl)-quinazol-4-one, 6-amino-2(4'-methylphenyl)-quinazol-4-one, 7-amino-quinazol-4-one, 2-(4'-aminophenyl)-quinazol-4-one, 2-(3'-aminophenyl)-quinazol-4-one, 2-(4'-amino-3'-methoxyphenyl)-quinazol-4-one, 2-(4'-amino-3'-chlorophenyl)-quinazol-4-one, 2-(3'-amino-4'-methylphenyl)-quinazol-4-one, 6-amino-2,4-dihydroxyquinazoline, 2-(4'-aminophenyl)-4,6-dihydroxy-1,3-diazine, 4-(4'-aminophenyl)-2,6-dihydroxy-1,3,5-triazine, 7-amino-phenmorphol-3-one, 6-amino-phenmorphol-3-one, 7-amino-6-chloro-phenmorphol-3-one, 7-amino-6-methyl-phenmorphol-3-one, 7-amino-6-methoxy-phenmorphol-3-one, 6-amino-quinol-2-one, 6-amino-4-methyl-quinol-2-one, 7-amino-4,6-dimethyl-quinol-2-one, 6-amino-7-chloro-4-methyl-quinol-2-one, 7-amino-4-methyl-6-methoxy-quinol-2-one, 6-amino-1,3-dihydroxy-isoquinoline, 6-amino-2,4-dihydroxyquinoline and 6-amino-2,3-dihydroxyquinoxaline and also 5-(4'-amino-2'-methyl-phenylazo)-benzimidazolone, 5-(4'-amino-2'-methyl-5'-methoxy-phenylazo)-benzimidazolone, 5-(4'-amino-2,5'-dimethoxyphenylazo)-benzimidazolone, 5-(4'-amino-benzoylamino)-benzimidazolone, 5-(3'-amino-benzoylamino)-benzimidazolone, 5-(3'-amino-4'-chlorobenzoylamino)-benzimidazolone, 5-(3'-amino-4'-methyl-benzoylamino)-benzimidazolone, 7-(4'-amino-2'-methyl-5'-methoxyphenylazo)-4-methylquinol-2-one, 6-(4'-amino-2'-methylphenylazo)-quinazol-4-one, 2-[(4''-amino-2''-methyl-5''-methoxyphenyl)-4'-azophenylene]-quinazol-4-one and 7-(4'-amino-2'-methylphenylazo)-phenmorphol-3-one.

The condensation reaction of the diimino-isoindoline with the cyanacetamide is appropriately carried out by reacting these compounds in water or in an organic solvent, preferably a hydrophilic organic solvent, for example aliphatic alcohols with 1–4 C atoms, such as methanol, ethanol, isopropanol or butanol, and also glycols or glycol ethers or open-chain or cyclic amides, such as dimethylformamide, dimethylacetamide or N-methylpyrrolidone, and it is also possible to use mixtures of the solvents mentioned. The reaction is appropriately carried out at temperatures between 20°–100°. When the reaction is carried out in a molar ratio of 1:1 it is preferable to use an excess of the diiminoisoindoline component in order to prevent the formation of symmetrical dicondensation products. Since the reaction products are sparingly soluble they can be separated from unchanged diiminoisoindoline by filtration and the mono-reaction products are isolated in a pure form.

The conversion of the dialkoxy- and diaryloxy-iminoisoindolines of the formula VI is carried out in a neutral or weakly acid reaction medium. In other respects the conditions are the same as those for the condensation reaction of diimino-isoindoline.

The resulting pigments usually already precipitate from the hot reaction medium and can be isolated in a pure form by filtering off and, optionally, by washing with organic solvents.

In general, the pigments obtained have a good texture and can usually be used in the form of the crude products. If it is necessary or desired, the crude product can be converted into a finely dispersed form by grinding or kneading. For this purpose it is appropriate to use grinding aids, such as inorganic and/or organic salts in the presence or absence of organic solvents. An improvement in the properties can frequently also be achieved by treating the crude pigments with organic solvents. After grinding, the aids are removed in the customary manner, soluble inorganic salts being removed, for example, with water and organic aids which are insoluble in water being removed, for example, by steam distillation.

The pigments obtained according to the invention are suitable for dyeing high molecular weight organic material of natural or synthetic origin. The materials can be, for example, natural resins, drying oils or rubber. However, they can also be modified natural substances, for example chlorinated rubber, oil-modified alkyd resins or cellulose derivatives, such as viscose, acetylcellulose and nitrocellulose, and especially fully synthetic organic polymeric plastics, that is to say plastics which are manufactured by polymerisation, polycondensation and polyaddition. From this category of plastics, the following may be mentioned in particular: polyethylene, polypropylene, polyisobutylene, polystyrene, polyvinyl chloride, polyvinyl acetate, polyacrylonitrile, polyacrylic acid esters and polymethacrylic acid esters; polyesters, especially high molecular weight esters of aromatic polycarboxylic acids with polyfunctional alcohols; polyamides; the condensation products of formaldehyde with phenols, that is to say the so-called phenoplasts, and the condensation products of formaldehyde with urea, thiourea and melamine, that is to say the so-called aminoplasts; the polyesters which are used as lacquer resins and in particular both saturated polyesters, such as, for example alkyd resins, and unsaturated polyesters, such as, for example, maleic resins, and also the polyaddition and polycondensation products of epichlorohydrin with diols or polyphenols, which are known by the name "epoxide resins"; and also the so-called thermoplastics, that is to say the non-curable polymeric plastics. It is emphasised that not only the single compounds, but also mixtures of polymeric plastics, as well as cocondensates and copolymers, such as, for example, those based on butadiene, can be pigmented according to the invention.

The pigments according to the invention are suitable for colouring vinyl, polyolefine and styrene polymers, such as polymeric plastics, and so-called film-forming agents or binders, which are known as lacquer raw materials, and especially boiled linseed oil, nitrocellulose, alkyd resins, melamine resins and urea-formaldehyde resins. Pigmentation of the high molecular weight organic substances with the pigments of the formula (I) is carried out, for example, by mixing a pigment of this type, optionally in the form of a master batch, with these substrates using roll mills, mixing apparatuses or grinding apparatuses. The pigmented material is then brought into the desired final form by processes which are in themselves known, such as calendering, compression moulding, extrusion, coating or casting or by injection moulding. Frequently it is desirable, in order to manufacture non-rigid mouldings or in order to reduce their brittleness, to incorporate so-called plasticisers into the high molecular weight compounds prior to moulding. Plasticisers which can be used are, for example, esters of phosphoric acid, phthalic acid or sebacic acid. In the process according to the invention, the plasticisers can be incorporated into the polymeric plastics before or after the pigment dyestuff is incorporated. It is also possible, in order to achieve different colour shades, also to add, in addition to the compounds of the formula (I), fillers or other chromophoric constituents, such as white pigments, coloured pigments or black pigments, in any desired amounts to the high molecular weight organic substances.

In order to pigment lacquers and printing pastes, the high molecular weight organic materials and the compounds of the formula (I), optionally together with additives such as fillers, other pigments, siccatives or plasticisers, are finely dispersed or dissolved in a common organic solvent or solvent mixture. The procedure can be such that each of the individual components is dispersed or dissolved on its own or several of these components are dispersed or dissolved together and only then are all the components combined.

In general, the pigmented high molecular weight organic materials contain amounts of from 0.001 to 30% by weight of a compound of the formula (I), relative to the high molecular weight organic substance to be pigmented; polymeric plastics and lacquers preferably contain 0.1 to 5% of such a compound and printing pastes preferably contain 10 to 30% of such a compound. The amount of pigment to be chosen depends above all on the desired depth of colour and also on the layer thickness of the moulding and finally in some cases also on the content of white pigment in the polymeric plastic.

The pigmented high molecular weight organic substances exhibit very fast yellow or brown colour shades and are distinguished by good fastness to light, weathering, migration, overlacquering and solvents and by good heat resistance. The pigments also display a good depth of colour.

The examples which follow illustrate the invention. The temperatures in the examples are given in degrees Centigrade.

EXAMPLE 1

10.8 g of 5-cyanacetylamino-benzimidazol-2-one are thoroughly suspended in 80 ml of dimethylformamide and the suspension is added to a solution of 23.3 g of 1,3-diimino-isoindoline and 50 ml of methanol. The reaction mixture, which develops an orange colouration, is heated to 70° for 2 hours. The precipitate which has formed is filtered off hot, washed with methanol, acetone and water and dried. In this way, 16.3 g (94.5% of theory) of the pigment of the formula:

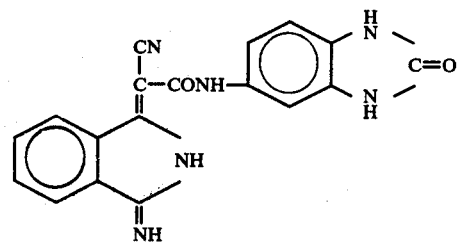

are obtained. The pigment can be employed direct for pigmenting lacquers and plastics. The pigmentations are distinguished by a deep reddish-tinged yellow colour shade and by outstanding fastness to light, migration and over-lacquering.

EXAMPLE 2

5.8 g of 1,3-diimino-isoindoline and 5.4 g of 5-cyanacetylamino-benzimidazol-2-one in 100 ml of water are heated to 90°–95°, whilst stirring well. The yellow pigment separates out as a crystalline precipitate. After 3 hours, the mixture is filtered and the pigment is washed with water and dried. This gives the same pigment as in Example 1.

The crude pigment is brought into a state of fine division, for example by grinding in isopropanol with the aid of grinding media. When the finely divided pigment is milled into polyvinyl chloride, yellow sheets which are distinguished by good stability to light, migration and heat are produced.

EXAMPLE 3

1.75 g of sodium methylate are added dropwise, at 15°–20°, to 3.1 g of phthalonitrile and 30 ml of methanol, whilst stirring. After 1-2 hours the mixture is neutralised with acetic acid. A suspension of 4.3 g of 5-cyanacetylamino-benzimidazol-2-one in 30 ml of dimethylformamide is then added and the mixture is warmed to 70° for 3 hours. The pigment which has precipitated out is filtered off hot, washed with methanol, acetone and water and dried. This gives the same pigment as in Example 1.

EXAMPLES 4–20

If, in Example 1, the 5-cyanacetylamino-benzimidazol-2-one is replaced by a cyanacetarylide of the formula $NCCH_2CONR$, wherein R has the meaning indicated in column 2 of Table I which follows, the same procedure also gives fast pigments which, in lacquer, have the colour shade described in the table.

TABLE I

| No. | R | Colour shade in lacquer |
|---|---|---|
| 4 | (structure) | medium yellow |
| 5 | (structure) | medium yellow |
| 6 | (structure) | reddish-tinged yellow |
| 7 | (structure) | medium yellow |
| 8 | (structure) | greenish-tinged yellow |
| 9 | (structure) | orange |
| 10 | (structure) | red-brown |
| 11 | (structure) | reddish-tinged yellow |
| 12 | (structure) | reddish-tinged yellow |
| 13 | (structure) | medium yellow |
| 14 | (structure) | greenish-tinged yellow |

TABLE I-continued

| No. | R | Colour shade in lacquer |
|---|---|---|
| 15 | (structure) | medium yellow |
| 16 | (structure) | medium yellow |
| 17 | (structure) | medium yellow |
| 18 | (structure) | reddish-tinged yellow |
| 19 | (structure) | medium yellow |
| 20 | (structure) | reddish-tinged yellow |

EXAMPLE 21

2.3 g of 5-cyanacetylamino-1-methyl-benzimidazol-2-one are stirred well into 30 ml of N-methylpyrrolidone and the mixture is added to a suspension of 2.15 g of 1,3-diimino5,6-dichloro-isoindoline and 20 ml of methanol. The mixture is warmed to 70° for 2 hours. The red-brown reaction product which has formed is filtered off hot, washed with acetone, methanol and water and dried. In this way, 3.1 g (72.5% of theory) of the pigment of the formula:

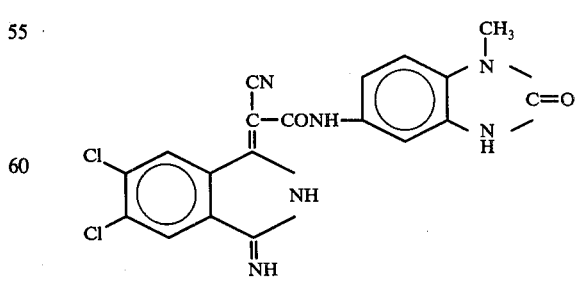

are obtained. The pigment is brought into a state of fine division by grinding with salt. Lacquers and sheets of PVC which are coloured with this pigment display an orange colour shade and are distinguished by good fastness to light, migration and overlacquering.

EXAMPLES 22–25

If, in Example 21, the 5-cyanacetylamino-1-methyl-benzimidazol-2-one is replaced by a cyanacetarylide of the formula CNCH$_2$CONR, wherein R has the meaning indicated in column II of Table II which follows, the same procedure also gives fast pigments which, in sheets of PVC, give the colour shade described in the table.

Table II

| No. | R | Colour shade in PVC |
|---|---|---|
| 22 | (structure) | brown |
| 23 | (structure) | yellow |
| 24 | (structure) | yellow |
| 25 | (structure) | yellow |

EXAMPLE 26

13.3 g of tetrachlorophthalonitrile are reacted in 50 ml of methanol with 4.4 g of a 30% strength methanolic solution of sodium methylate. The resulting turbid solution is neutralised with acetic acid after 1½ hours. A suspension of cyanacetic acid 3,4-dichloroanilide is then added and the mixture is warmed under reflux for 2 hours. The yellow precipitate which has formed is filtered off and washed with dimethylformamide, methanol and water. In this way, 15 g of the pigment of the formula

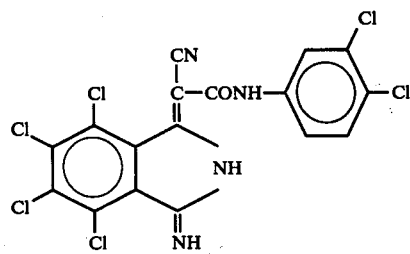

are obtained. The pigment is brought into a state of fine division by grinding with salt. Lacquers which are coloured with this pigment display a yellow colour shade and are fast to overlacquering.

EXAMPLE 27

2 g of the pigment prepared according to Example 1 are ground with 36 g of hydrated alumina, 60 g of boiled linseed oil of medium viscosity and 2 g of cobalt linoleate on a triple roll mill. The yellow prints produced with the resulting colour paste are deep and fast to light.

EXAMPLE 28

0.6 g of the pigment prepared according to Example 1 are mixed together with 67 g of polyvinyl chloride, 33 g of dioctyl phthalate, 2 g of dibutyl-tin dilaurate and 2 g of titanium dioxide and the mixture is processed on a roll mill for 15 minutes at 160° C to give a thin sheet. The yellow colouration produced in this way is deep and fast to migration, heat and light.

EXAMPLE 29

10 g of titanium dioxide and 2 g of the pigment prepared in accordance with Example 1 are ground with 88 g of a mixture of 26.4 g of coconut alkyd resin, 24.0 g of melamine/formaldehyde resin (50% solids content), 8.8 g of ethylene glycol monomethyl ether and 28.8 g of xylene for 48 hours in a ball mill.

If this lacquer is sprayed onto an aluminium foil, pre-dried for 30 minutes at room temperature and then baked for 30 minutes at 120° C, a yellow lacquer coating is obtained which is distinguished by good fastness to overlacquering and light, coupled with good depth of colour.

What is claimed is:

1. An isoindoline pigment of the formula

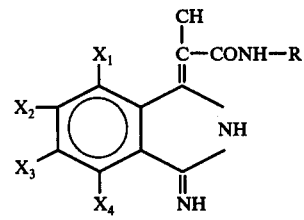

wherein R denotes a radical of the formula

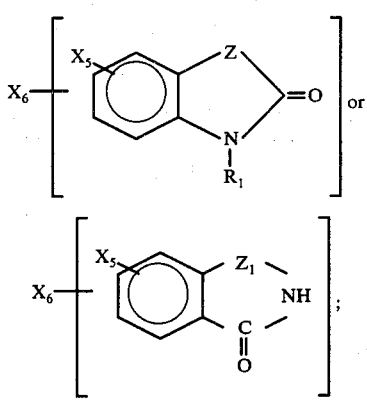 or $X_1$, $X_2$, $X_3$, and $X_4$ denote hydrogen, halogen, or one or two of the radicals $X_1$–$X_4$ denote nitro, alkyl, alkoxy or phenoxy and the others denote hydrogen; $X_5$ denotes hydrogen, halogen, alkyl containing 1–4 carbon atoms, alkoxy containing 1–4 carbon atoms, or phenoxy; $X_6$ is a direct bond when linked to the benzene ring or phenylene when linked to the heterocyclic ring; Z denotes O, S, or a group of the formula

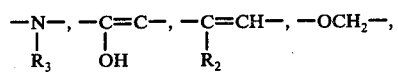

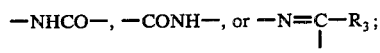

wherein $R_2$ and $R_3$ denote hydrogen, alkyl containing 1–4 carbon atoms, phenyl, or phenyl substituted by halogen, alkyl containing 1–4 carbon atoms, alkoxy containing 1–4 carbon atoms, or alkanoylamino containing 1–4 carbon atoms; $R_1$ denotes hydrogen, alkyl containing 1–4 carbon atoms, phenyl, or phenyl substituted by halogen, alkyl of 1–4 carbon atoms, alkoxy of 1–4 carbon atoms, or alkanoylamino containing 1–4 carbon atoms; and Z must represent a NH group when $R_1$ does not denote hydrogen.

2. Isoindoline pigment according to Claim 1, wherein R denotes a radical of the formula

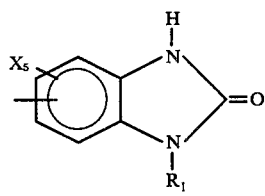

wherein $X_5$ and $R_1$ have the meaning indicated in claim 1.

3. The isoindoline pigment according to claim 1 of the formula

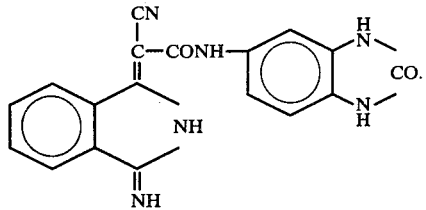

4. The isoindoline pigment according to claim 1 of the formula

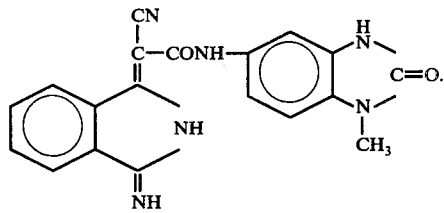

5. The isoindoline pigment according to claim 1 of the formula

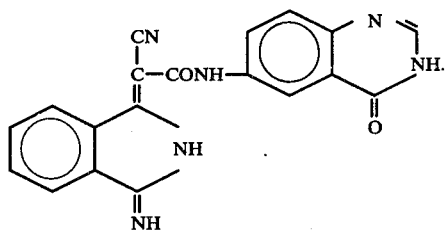

6. The isoindoline pigment according to claim 1 of the formula

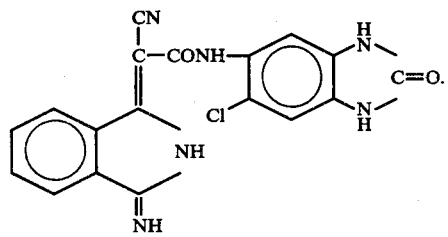

7. The isoindoline pigment according to claim 1 of the formula

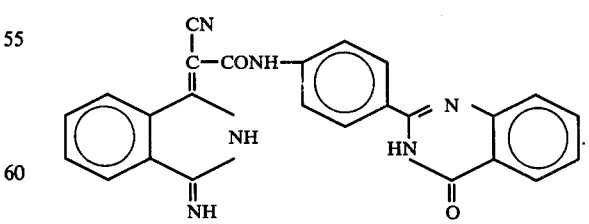

* * * * *